United States Patent [19]

Fawcett, Jr. et al.

[11] Patent Number: 5,448,919
[45] Date of Patent: Sep. 12, 1995

[54] GAS FLOW METER

[75] Inventors: Lyman W. Fawcett, Jr.; Michael A. Ansel, both of St. Petersburg; Chi Pham, Clearwater, all of Fla.

[73] Assignee: Ametek, Inc., New York, N.Y.

[21] Appl. No.: 987,442

[22] Filed: Dec. 7, 1992

[51] Int. Cl.$^6$ .............................................. G01F 1/708
[52] U.S. Cl. ............................................. 73/861.03
[58] Field of Search ................................... 73/861.03

[56] References Cited

U.S. PATENT DOCUMENTS

| | | | |
|---|---|---|---|
| 3,248,941 | 5/1966 | McArthur | 73/194 |
| 3,277,707 | 10/1966 | Rodel | 73/861.05 |
| 3,748,902 | 7/1973 | Guild | 73/861.05 |
| 4,210,809 | 7/1980 | Pelavin | 73/861.05 |
| 4,691,577 | 9/1987 | Lalin et al. | 73/861.05 |
| 4,762,004 | 8/1988 | Lalin et al. | 73/861.05 |
| 4,860,590 | 8/1989 | Buck | 73/861.05 |
| 4,860,592 | 8/1989 | Van Emden et al. | 73/361.05 |
| 4,879,907 | 11/1989 | Patterson et al. | 73/861.05 |
| 4,914,955 | 4/1990 | Stonestrom | 73/861.05 |
| 5,142,271 | 8/1992 | Bailey et al. | 73/861.56 |

FOREIGN PATENT DOCUMENTS 2083612 3/1982 United Kingdom ............ 73/861.05

Primary Examiner—Herbert Goldstein
Attorney, Agent, or Firm—Amster, Rothstein & Ebenstein

[57] ABSTRACT

An improved gas flow meter which measures the time of travel of a soap film through a fixed volume to compute gas flow rate. A portable meter includes infrared sensors which detect the passing of a soap film, a timing circuit to determine the time of travel between the beginning and end of the fixed volume and a method of blocking the infrared portion of ambient light to allow for use outdoors. The device has a unique method of generating the soap bubble and for breaking the soap bubble at the end of the fixed volume. The unique flow unit, including flow cell and fixed sensors, is calibrated to determine the fixed volume which is stored in a non-volatile memory location as a part of the flow unit.

15 Claims, 3 Drawing Sheets

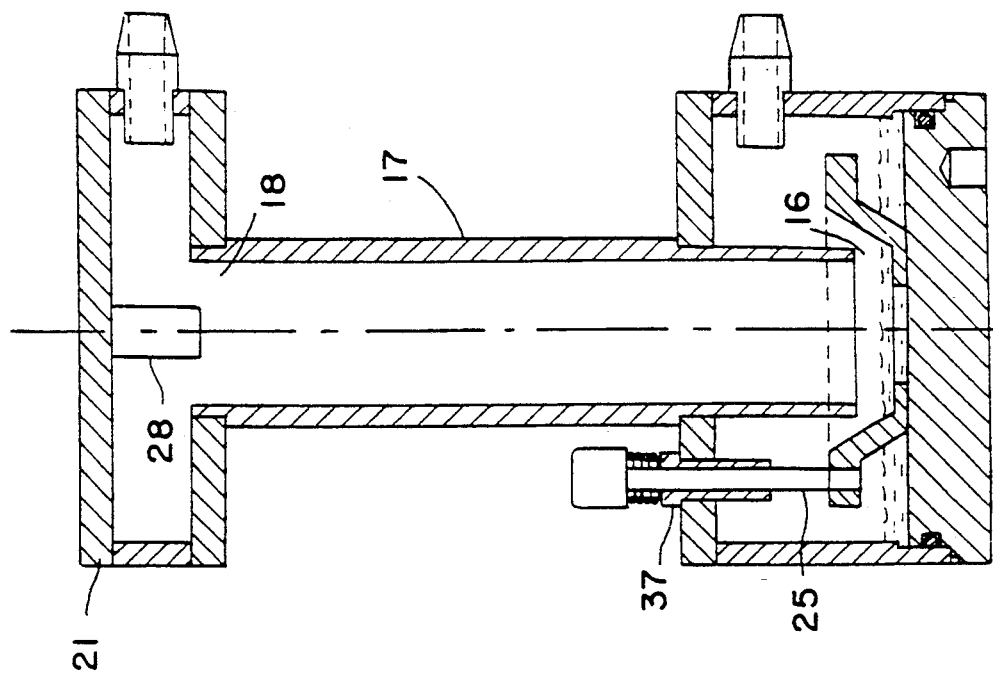
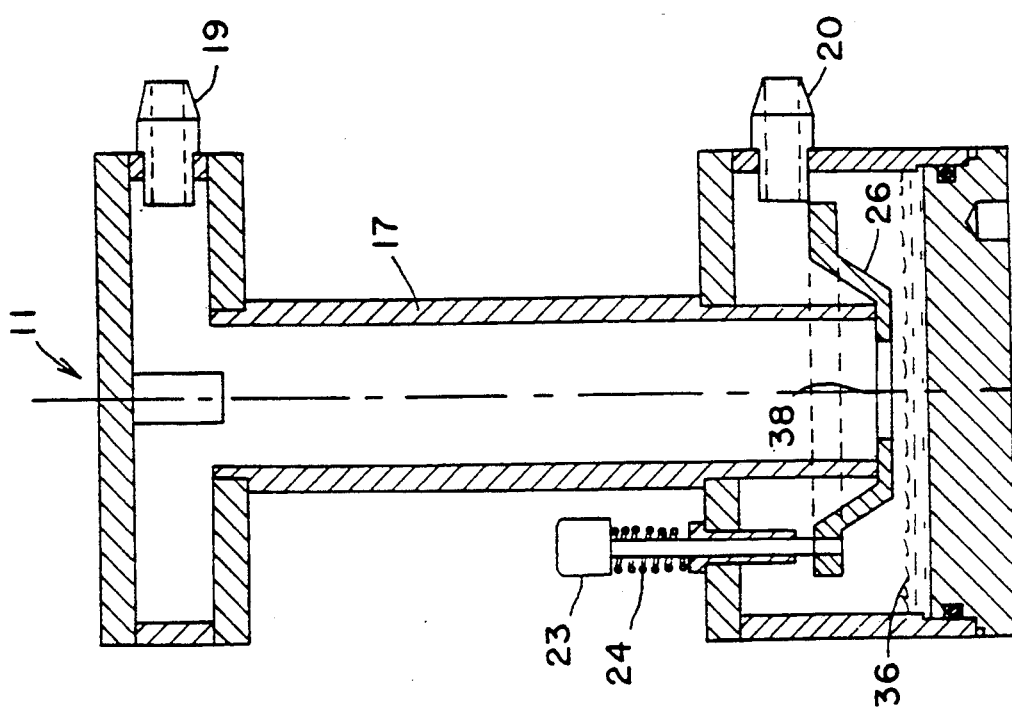

GAS FLOW METER

FIELD OF THE INVENTION

This invention relates in general to gas flow meters and, in particular, to systems which operate on the principle of measuring the time displacement of a soap film between two points in a flow tube having a fixed volume, with the time displacement being converted into a measurement of the rate of flow of the gas.

BACKGROUND OF THE INVENTION

In the past many methods have been used to measure the flow rate of a gas. One of these methods, which has been made portable, consists of a flow tube, for which the volume is known very accurately between two fixed points which are provided with sensors, a frictionless piston made up of a soap film, and a base unit to which the flow tube is attached, including means for recording the time of travel of the frictionless piston between the two points. Generally, a reservoir of soap solution is provided near the base of the flow tube. A film of the soap is applied to a "bubble maker", a generally circular ring which is suspended above the reservoir. Gas filling the flow tube causes the soap film to move off of the ring and to proceed through the flow tube, passing the sensors one at a time. The time of travel of the film, or "bubble", between the sensors defining the fixed volume or critical volume area is proportional to the rate of flow of the gas through the flow tube. Initial "wetting" of the sidewalls of the flow tube has been taught as a method for reducing the friction acting against the film as it is carried up the tube by the gas flow. To that end, the prior art has taught that it is preferable to allow several film bubbles to traverse the flow tube and burst prior to sensing the passage of the film and measuring the flow rate.

Numerous devices which have been developed in the past, one of which is illustrated in U.S. Pat. No. 4,860,590 issued to Buck, use optical sensors to detect when the soap film crosses the fixed points. The systems may further include a microprocessor based timing circuit which receives the detection signals from the sensors and records the time at which each sensor was passed, thereby yielding the time that the bubble spent traversing the critical volume area of the tube. The microprocessor in the base unit can additionally calculate the rate of flow of the gas by dividing the fixed volume of the tube by the measured time required for the soap film to pass through that volume. Thus, the flow rate of the gas is computed based on the fixed volume of the flow tube and the time required for a bubble to traverse that volume. Devices of this type typically claim accuracies of +/−0.5%.

Sources of error are inherent in the systems which have been used in the past. One source of error, particularly associated with mass-produced meters, is the inability to readily establish the volume of the flow tube. There is great difficulty in maintaining strict tolerances, and the cost of manufacturing flow tubes with precise dimensions having specifically placed sensors can be prohibitive. Absent strict manufacturing standards however, one cannot be guaranteed that a given flow tube has the exact intended volume between the sensors once it is assembled with the base unit. In most of the prior art metering systems, the inexact volume of the tube is compensated for by moving the sensors along the height of the tube until the volume readings indicate the desired preset volume value. In the above-referenced Buck patent, there is taught a means by which the volume of an individual flow tube can be approximated and stored by the microprocessor and switches associated with the base unit once the meter has been assembled. The Buck system provides a gas having a known flow rate through the assembled meter and calculates the flow rate for that gas as it passes through the flow tube's fixed volume, using the stored value of the "ideal" volume of the tube in the calculation (i.e., the volume which the flow tube was manufactured to contain). The calculated flow rate is then compared to the known flow rate and any deviation is assumed to be due to a difference between the ideal and the actual volume magnitude of the flow tube. The difference in the magnitudes is then compensated for by adjusting the stored value of the volume to reflect the actual volume of the flow tube. The stored value is adjusted by DIP switches (representing a matrix of volume values) which are coupled to the microprocessor. Thereafter, the microprocessor will calculate the flow rate using the actual measured volume of the flow tube which is the combined value of the ideal volume stored in the microprocessor of the base unit and adjustments as stored the DIP switches coupled thereto. This latter Buck system does not require that the sensors be moved during the calibration, which is preferable given the sensitivity of the sensor components and the alignment challenges attending the placement of same. However, in the Buck system, any time that a different flow tube is provided to the base unit, re-calibration and consequent re-adjustment of the DIP switches is required. What is desirable is a means to precisely determine the volume of the flow tube and digitally record this value in nonvolatile memory associated with the tube itself rather, that the base unit, thus allowing for exacting flow rate calculations without maintaining exact machining dimensions and without the necessity of repositioning system components, thereby reducing manufacturing and assembly concerns and costs while still achieving a high accuracy with the flow device.

Another source of error in gas flow meters is the generation of bubbles, soap films introduced into the flow tube in the absense of gas flow. This can result when a film of the soap has been applied to the bubble maker and the ring comprising the bubble maker has substantially the same diameter as the flow tube. Mere contact with the sidewalls of the flow tube may result in transfer of the soap film to the flow tube, which can effect sensing of "flow" in the absense of any gas flowing in the tube. Furthermore, the presence of the film in the tube will necessarily affect the next intended measurement.

A further design inefficiency of gas flow meters involves the length of the flow tube, beyond the critical volume area between the sensors. Prior flow meter designs have had difficulty in completely bursting the soap film after it has traversed the critical volume area of the flow tube. Typically, the soap film is allowed to proceed to an upper surface, beyond the critical volume area, at which the film essentially collapses or bursts with the soap solution then running back along a given path to the reservoir below. A difficulty is encountered when the films, or the so-called "bubbles", don't collapse or burst completely, resulting in a multitude of small malformed bubbles at the upper end of the tube. Known designs encourage the formation of small bubbles since the bursting surface at the upper end of the tube generally is joined to the upper sidewalls of the tube itself. The build up of smaller bubbles can result in excessive flow of bubbles and/or liquid along the sidewalls of the flow tube and consequent interference with the sensors. The incomplete bursting problem therefore necessitates leaving considerable time between measurements so that the small bubbles have sufficient time to eventually dissipate before their presence can interfere with the sensors and the subsequent measurements. Increasing the time between successive flow measurements, to allow the small bubbles to burst themselves, can be time consuming and therefore unacceptable to many users of the flowmeter. An alternative solution, which has been adopted by many flow meter manufacturers, is to increase the length of the flow tube from the critical volume area, at the later encountered sensor, to the upper end of the tube at which the film is to be burst. Due to the portability of the device, it is evident that the ability to fully burst the bubble at a controlled point would desirably reduce the size of the flow tube and the time between successive measurements.

Another problem is particularly associated with the prior art flow meters which utilize optical sensors. Many of the prior art portable flow meters which incorporate optical sensors have difficulty operating in varying ambient light conditions. A large amount of background light, such as the condition which exists when operating out of doors or near an outside window, causes the optical sensors to erroneously fail to detect a bubble passing through the tube. Although prior art references, such as the Buck patent, teach that the use of infrared sensors can eliminate the problem, infrared sensors are nonetheless sensitive to the infrared components of ambient light which can adversely affect the operation of the sensors. It is therefore desirable to have a method of filtering the infrared portion of the ambient light, to an acceptable level for the infrared emitter detector pairs which are incorporated into the flow meter device.

OBJECTIVES OF THE INVENTION

It is therefore an objective of the present invention to provide an improved portable primary gas flow meter which is inexpensive to produce, operates reliably and is accurate.

It is a further objective of the present invention to eliminate the necessity of unused volume in a gas flow meter between the upper sensor and the bubble breaker at the upper end of the flow tube.

It is-yet another objective to store the exact volume of the flow tube, between fixed sensor locations, as a digital number in nonvolatile memory associated with the flow tube itself.

Still another objective of the invention is to block ambient infrared light to allow a portable flow meter having optical sensors to be used in conditions of ambient light which would otherwise interfere with the sensors.

Yet another objective of the present invention is to provide a gas flow meter which does not permit transfer of soap film to the flow tube in the absense of gas flow.

SUMMARY OF THE INVENTION

These and other objectives of the invention are realized in a primary gas flow meter including: a compact flow tube having a nonvolatile memory associated therewith for storing the exact volume between the fixed sensors of the flow tube and a reliable means for completely breaking the soap film said means consisting of an abutment at the upper end of the flow tube which has no contact with the inside of the flow tube; a bubble maker consisting of a cup with an annulus, having a diameter smaller than that of the flow tube, which reliably produces a single soap film when depressed into a soap solution and transfers the film to the flow tube only when a gas flow condition exists; optical sensors for sensing the passage of the film or bubble; and, an infrared filter means to shield the optical sensors from infrared components of ambient light. The soap film or bubble will travel into the flow tube only in the presence of gas flow and will maintain contact with the flow tube being propelled by the flowing gas along the tube at a rate of travel which is proportional to the flow rate of the gas. A pair of infrared optical detectors and emitters will detect the passage of the bubble through the flow tube and control the timing circuit. A means for filtering ambient light, to prevent the infrared portion of the light from entering the detectors and causing a fuilure to detect the soap film, consists of a filter incorporated into the top chamber of the flow tube (which may additionally include bubble bursting apparatus) and/or incorporated into the housing cover of the flowmeter assembly.

BRIEF DESCRIPTION OF THE DRAWINGS

The invention will hereinafter be described in further detail with specific reference to the ataches figures wherein:

FIGS. 4A and 4B illustrate the bubble breaker and buble forming cup.

DETAILED DESCRIPTION OF THE INVENTION

Figure 1:
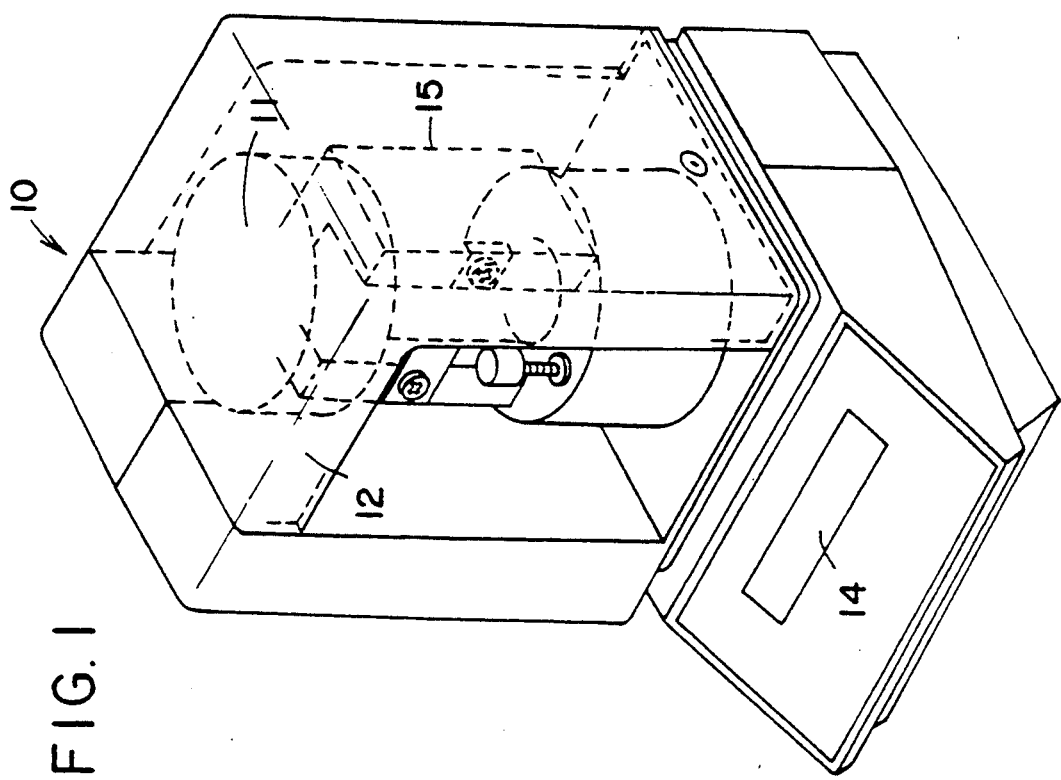
FIG. 1 is a front elevation view of the inventive gas flow meter illustrating the microcomputer housing, flow cell, sensor block and light filtering housing cover.

With reference to FIG. 1, the basic components of one form of the present invention are illustrated. Gas flow meter 10 comprises a flow cell 11, a soap film detecting sensor block 15, a microprocessor based dsplay 14 and an infrared light blocking cover 12. The features of the flow cell, 11, are further detailed in FIG. 2 wherein flow cell 11 comprises a flow tube 17 having a first end 156 which protrudes into reservoir chamber 22, and a second end 18 which terminates in upper chamber 21. The upper chamber 21 has an infrared light blocking cap 39 in accordance with the teachings of the present invention. A gas flow inlet 20 is disposed within reservoir chamber 22 while gas flow outlet 19 is disposed within the upper chamber 21. In operation, as in the prior art, the gas is provided to the reservoir chamber 22 via gas flow inlet 20. A soap film, which has been applied to the first end, 16, of the flow tube is made to travel up the flow tube due to the flow of the gas. The film's passage will be detected by sensors, further illustrated in FIG. 3, and will terminate at the second end, 18, of the flow tube. When the film has collapsed, or burst, in the upper chamber 21, the gas is exhausted out of gas flow outlet 19.

Figure 3:
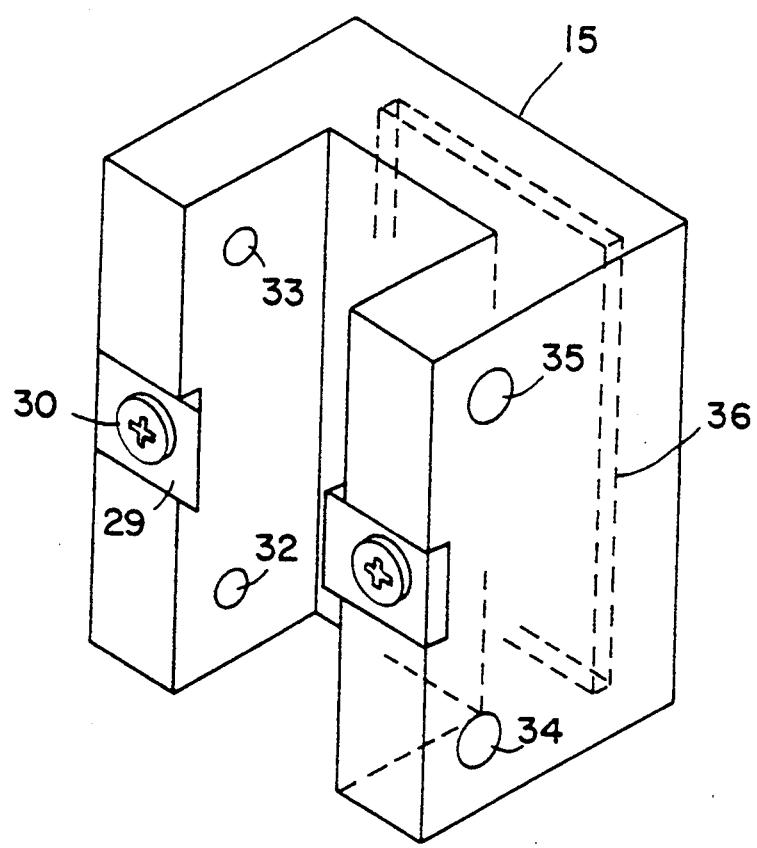
FIG. 3 illustrates the sensor block.

Turning to FIG. 3, sensor block 15 comprises of flow cell clamp 29 held in place by screw 30. A circuit board 36 has the drivers for the infrared emitters 32 and 33 and infrared detectors 34 and 35. Circuit board 36 also maintains the digital value of volume which is associated with the particular flow tube 17 and sensor block 15 that it has been calibrated on. When assembled, the flow cell and sensor assembly, the so-called "flow unit", is calibrated not by estimating or adjusting as in the past, but by measuring the actual volume of the flow tube between the fixedly mounted sensors and storing that volume value in a nonvolatile memory location associated with the flow cell and sensor assembly. In accordance with the present invention, a flow cell and sensor block comprise a single interchangeable flow unit for use with any base unit, together forming a gas flow meter. A variety of flow cell and sensor block pairs, or flow units, with sensitivity , etc. corresponding to a needed range of flow rates, can be used with any microprocessor based display 14 base unit. As discussed above, the optical sensors readily detect the passage of the soap film traversing the flow tube. It is to be noted that many of the inventive features of the present invention are not limited to a gas flow meter which uses optical sensors. Other sensors which are known to be equivalents in the art may readily be substituted for the optical sensors without departing from the teachings and claims of the present invention.

Referring to FIGS. 4A and 4B, the details of the inventive bubble maker and bubble breaker components will now be described. Flow cell 11 depressing button 23 compresses spring 24 causing shaft 25 to lower cup 26 into soap solution 36. Releasing button 23 allows cup 26 to raise to its resting position on the bottom of tube 17. Upon releasing the button, the annulus 38 of cup 26 will have applied to it a film of soap. It is also possible to construct a system wherein the soap solution 36 is brought up to the cup 26 to similarly apply the solution to the annulus 38 of the cup. Clearly the method of application of the film to the cup is not critical to the present invention. What is critical is that the diameter of the annulus 38 be less than the interior diameter of the flow tube 17. A gas flow condition causes a soap film to be transferred from annulus 38 to the first end of flow tube 17. In the absence of gas flow the soap film remains on annulus 38, since the film will not be in physical contact with the sidewalls of the flow tube. As noted above, the specific relationship between the diameter of the annulus and the interior diameter of the flow tube insures that no film will be transferred to the flow tube in the absense of gas flow in the system. Consequently, the system will not falsely detect gas flow. In accordance with principles known in the art, one cannot restrict the gas flow, by placing too narrow a passageway in the gas flow meter assembly, and expect accurate measurements. Similarly, the lower limit for the diameter of the annulus is the point at which the flow of gas through the assembly would be compromised.

Bubble breaker 28, is located in upper chamber 21 and protrudes into the second, upper end 18 of tube 17. The bubble breaker 28 completely bursts the soap film upon contact. Since there is no physical contact between the edges of the bubble breaker and the flow tube sidewalls, the formation of smaller bubbles and the problems attendant thereto are avoided. Moreover, the initial wetting of the sidewalls is facilitated by the complete bubble breaking at breaker 28. By virtue of the use of the present bubble breaker, there is no need to extend the physical length of the tube nor to wait an extended period between measurements due to the formation of small bubbles.

In operation, a film of the soap solution is applied to the annulus 38 of cup 26, either by the operation of plunging the cup into a reservoir of the solution as described above, or by moving the reservoir to the cup. The film spans the diameter of the annulus 38 but does not span the diameter of end 16 of the flow tube. Upon the flow of gas through inlet 20, the film is transferred from the annulus 38 to the flow tube 17 and travels up the sidewalls of the tube at a rate proportional to the gas flow rate. Under initial conditions, the film may encounter too much friction to complete its traversal of the flow tube, since the soap film will tend to wet the sidewalls and thin the bubble itself until it bursts. As noted above, several bubbles should ideally be sent up the flow tube until all of the sidewalls have been wetted, by both the film wetting the sidewalls due to the friction along the walls and by the downflow of solution caused when bubbled successfully traverse the length of the flow tube and are completely burst at bubble breaker 28. The process of forming soap films is continued until the sidewalls of tube 17 are fully wetted. This is evident when the soap films completely traverse the length of tube 17 and burst upon making contact with bubble breaker 28. Once tube 17 is fully wetted, the measurement is begun by producing a single soap film on annulus 38 and transferring it to end 16 of tube 17. The soap film is propelled by the gas through tube 17 crossing infrared sensor pair 32, 34 causing circuit 36 to send a signal to microprocessor 14 which starts the timing circuit. The time of travel is recorded, for use in the flow rate computation, when the soap film crosses infrared sensor pair 33, 35 causing circuit 36 to send a signal to microprocessor 14 which stops the timing circuit. The soap film is completely burst when it contacts bubble breaker 28 at or near end 18 of tube 17. The gas flow rate is computed by knowing the volume encompassed by tube 17 between sensor pair 32, 34 and sensor pair 33, 35, which value is provided to the microprocessor 14 from its nonvolatile memory location on board 36, and dividing this value by the recorded time of travel of the soap film between the sensor pairs.

Figure 2:
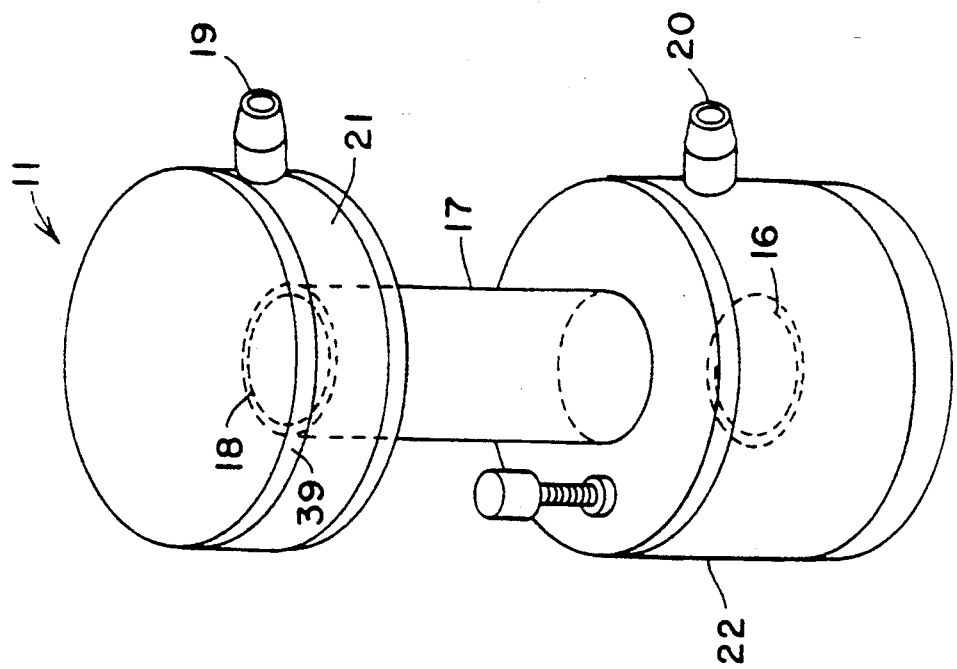
FIG. 2 is a simplified view of the flow unit illustrating the sensor block the flow tube, a first chamber having a soap solution reservoir, and upper second chamber and an infrared light blocking cap for the flow units' upper chamber.

The accuracy of the gas flow rate measurement is a function of the accuracy and precision of the timing circuit mathematically combined with the accuracy and precision of the volume of tube 17 as stored in the nonvolatile memory 36. The ability to store, in nonvolatile memory 36, the exact volume of tube 17 is necessary due to the production tolerances on the diameter of tube 17 and the production tolerances in the placement of the sensor pairs. When using optical sensors, as discussed above, it is desirable to filter out the infrared components of the ambient light. Infrared blocking top 39, as illustrated in FIG. 2 can be provided as part of the interchangeable flow unit, comprised of the calibrated flow cell and sensor block. Furthermore, an infrared light blocking cover 12 can additionally or alternatively be provided to the gas flow meter assembly 10, comprised of the flow unit and the base or microprocessor unit 14.

The present invention has been described with reference to several exemplary embodiments. It is to be recognized by one having skill in the art that modification may be made to the described embodiments without departing from the spirit and scope of the invention as defined by the appended claims.

What is claimed is:

1. A flow unit for use in a gas flow meter comprising a flow tube of fixed inner and outer diameter having a lower end and an upper end at which is located an upper chamber, and a sensor unit permanently attached to said flow tube, including at least two fixed sensor locations positioned between said ends and a nonvolatile memory location for storing the value of the fixed volume of the flow tube between the two sensor locations;

optical sensors at said two sensor locations for detecting the presence of gas flow in said tube; and wherein the top of said upper chamber includes a cap for filtering out infrared components of ambient light.

2. The flow unit of claim 1 wherein said top of said upper chamber additionally comprises a protrusion extending from said top into said flow tube and wherein the diameter of said protrusion is less than the inner diameter of said flow tube.

3. The flow unit of claim 1 additionally comprising a gas flow outlet in said upper chamber.

4. A flow unit for use in a gas flow meter comprising:

a flow tube of fixed inner and outer diameter having upper and lower ends;

a sensor unit permanently attached to said flow tube and comprising at least two fixed sensor locations positioned between said ends and a nonvolatile memory location for storing the value of the fixed volume of the flow tube between the two sensor locations;

a lower chamber associated with said lower end of said flow tube, said lower chamber having a reservoir of soap solution; and means for applying a film of said soap solution comprising a cup with an annulus having a diameter which is smaller than the inner diameter of said flow tube.

5. The flow unit of claim 4 further comprising a gas flow inlet in said lower chamber.

6. A gas flow meter comprising:

a flow unit comprising a flow tube with a fixed inner diameter and having upper and lower ends, said tube having at least first and last fixed sensor locations positioned between said upper and lower ends, and a sensor unit permanently attached to said flow tube including at least one nonvolatile memory location for storing the fixed volume of said flow tube between said sensor locations;

at least first and last sensors provided at said fixed sensor locations;

bubble generator comprising a cup with an annulus having a diameter which is less than the inner diameter of said flow tube and means for applying a film of soap to said annulus; and a system associated with said sensor locations for measuring the time for a bubble to pass through said fixed volume and adapted to produce an output indicative of such measured time.

7. The gas flow meter of claim 6 wherein said flow unit additionally comprises means for breaking a bubble after said bubble has passed said last sensor said means being located at the upper end of said flow tube.

8. The gas flow meter of claim 6 wherein said sensors are infrared optical sensors.

9. The gas flow meter of claim 6 further comprising a base unit adapted to receive said flow unit.

10. The gas flow meter of claim 6 further comprising means responsive to the output produced by said system for determining the flow rate of gas through said flow tube.

11. The gas flow meter of claim 10 wherein said means for determining the flow rate of gas through said flow tube includes means for retrieivng said fixed volume from said nonvolatile memory and means for calculating the flow rate of gas through said flow tube utilizing said fixed volume and said time value.

12. A gas flow meter comprising:

a flow unit comprising a flow tube withya fixed inner diameter and having upper and lower ends, said tube having at least first and last fixed sensor locations positioned between said upper and lower ends, and a sensor unit permanently attached to said flow tube including at least one nonvolatile memory location for storing the fixed volume of said flow tube between said sensor locations;

at least first and last infrared optical sensors provided at said fixed sensor locations;

a bubble generator for providing a bubble to said flow unit in the presence of gas flow through the flow unit;

a system associated with said sensor locations for measuring the time for a bubble to pass through said fixed volume and adapted to produce an output indicative of such measured time; and filter means disposed on said upper end of said flow tube for filtering out the infrared components of ambient light.

13. A method for measuring the flow rate of gas in a gas flow meter having a flow unit comprising a flow tube having a fixed inner diameter, a fixed volume and upper and lower ends and a sensor unit permanently attached to said flow tube including at least first and last sensors positioned between said ends and a nonvolatile memory for storing the value of said fixed volume of the flow tube between said first and last sensors, comprising the steps of:

storing the fixed volume of said flow tube in said at least one non-volatile memory location;

introducing a bubble into a first end of said flow tube by providing a soap film having a diameter which is less than the inner diameter of said flow tube and transferring said soap film to the flow tube in the presence of gas flow;

measuring the time for the bubble to traverse said fixed volume; and determining the flow rate from said time measurment and said stored value of the fixed volume of the flow tube.

14. The method of claim 13 wherein said gas flow meter further compriss means for measuring the time for a bubble to traverse said fixed volume between said first and last sensors and wherein said step of measuring the time includes the steps of:

first sensing said bubble at said first sensor;

initiating said means for measuring the time upon said first sensing;

last sensing said bubble at said last sensor; and stopping said means for measuring the time upon said last sensing.

15. The method of claim 13 wherein said determining step includes;

retrieving said fixed volume value from siad nonvolatile memory; and combining said time measure with said fixed volume value to calculate the gas flow rate.

* * * * *